March 14, 1967

P. KOLLSMAN 3,309,301

METHOD FOR PRODUCING A DEIONIZED LIQUID
PRODUCT BY ELECTRODIALYSIS

Filed April 16, 1962

INVENTOR.
Paul Kollsman
BY Howard G. Russell
his ATTORNEY

INVENTOR.
Paul Kollsman
BY Howard G. Russell
  his ATTORNEY

March 14, 1967

P. KOLLSMAN 3,309,301

METHOD FOR PRODUCING A DEIONIZED LIQUID
PRODUCT BY ELECTRODIALYSIS

Filed April 16, 1962

INVENTOR.
Paul Kollsman
BY Howard G. Russell
his ATTORNEY

United States Patent Office

3,309,301
Patented Mar. 14, 1967

3,309,301
METHOD FOR PRODUCING A DEIONIZED
LIQUID PRODUCT BY ELECTRODIALYSIS
Paul Kollsman, 100 E. 50th St., New York, N.Y. 10022
Filed Apr. 16, 1962, Ser. No. 187,747
25 Claims. (Cl. 204—180)

This invention relates to the art of electrodialysis, and is more particularly concerned with the production of deionized liquid products and apparatus for carrying out the advanced method.

According to the conventional procedure of producing a deionized liquid product by electrodialysis, the raw liquid which is to be treated is placed in a so-called deionization compartment of an electrodialysis cell bordered by two membranes, at least one, or both, of which are selectively ion permeable. A direct potential is then applied across the liquid and membranes as a result of which negative anions move through one membrane towards the positive anode and positive cations move in the opposite direction towards the negative cathode. The bordering membranes permit the emigrating ions to pass, but prevent ions of the opposite polarity from immigrating into the deionization compartment. The migration of ions results in a flow of an electric current through the cell.

The conventional procedure has numerous limitations. The degree of deionization which for practical purposes may be accomplished in a single pass of the raw liquid through the cell is limited, and it is necessary to employ several treatment stages in series where the ionic concentration of the raw liquid is to be reduced by a large ratio, as is the case of conversion of sea water to potable water.

The phenomenon of polarization, accompanied in many instances by an undesirable change in pH, imposes limitations on the current density which may be employed. The polarization problem is particularly serious where a high degree of deionization is to be attained.

Fouling of the membranes by ionic particles, scale formation, bacteria growth, are other phenomena which restrict the usefulness of the conventional deionization procedure.

A further limitation of the conventional methods is the fact that nonionic impurities remain in the raw liquid and defy removal by electrodialysis.

This invention is based on a different approach.

The invention employs the principle of moving the liquid component into a product chamber through a membrane by the movement of ions, in distinction from the conventional procedure of moving ions out of the raw liquid chamber to produce a deionized product in the same chamber. For this purpose two different types of membranes are employed. Ions of a certain polarity are first moved through a membrane through the pores of which the ions pass with a relatively large solvent shell and are then moved through a second membrane through which the ions can move only with a relatively small solvent shell by reason of a higher ionic concentration prevailing in the pore liquid of the latter membrane. Because of the difference in solvent transport through the two membranes, more solvent is transported by the moving ions into the space between the membranes than out of it, and the accumulating volume of solvent may be withdrawn as product liquid.

As the product liquid passes through a membrane whose pore size can be selected to be sufficiently small to filter out undesirable constituents, such as bacteria, a product of a very high purity can be obtained. For example, New York City tap water of a resistivity of 13,000 ohms cm. was deionized in a single pass through a three compartment apparatus embodying this invention to a resistivity of 2,000,000 ohms cm., a figure considerably exceeding that of distilled water.

The invention has many unique applications. It permits, for example, a certain solvent component to be extracted from a mixture. The extracted solvent may represent the desired product, as for example in the treatment of water, or it may represent a by-product or even waste in a case where a liquid is to be concentrated by the extraction of a liquid component from it.

The membranes employed in the practice of this method may be selected from a large number of commercially available membranes manufactured for the purpose of ultra-filtration and electrodialysis.

Ultrafiltration membranes are generally neither anionic nor cationic, and are manufactured from material of cellulosic, synthetic resinous, or mineral nature and are offered in a large range of pore sizes.

Ion exchange membranes are available which are either rigid or flexible. Both are usable in connection with this process and methods of manufacture of such membranes are well known.

Ultrafiltration membranes may also be treated to impart weak ion exchange characteristics to the material. This treatment gives the filter membranes certain desirable surface characteristics, for example hydrophilic properties, which have not yet been determined in detail. It is sufficient to note that sulfonation or quaternization improves the operation of certain commercially available ultrafiltration membranes in the practice of this invention.

The various objects, features and advantages of this invention will appear more fully from the detailed description which follows accompanied by drawings showing, for the purpose of illustration, different forms of apparatus for practicing the invention. The invention also resides in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and manners in which it may be carried out may be better understood by referring to the following description taken in connection with the accompanying drawings forming a part of it in which:

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction of the invention for the purpose of explanation of broader aspects of the invention, but it is understood that structural details may be modified in various respects without departure from the principles of the invention and that the invention may be incorporated in other structural forms than shown.

Figure 1:
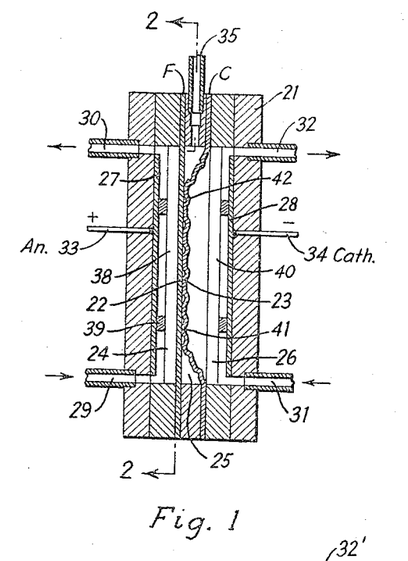
FIG. 1 is a vertical cross section through a three compartment cell for practicing the invention.
Figure 2:
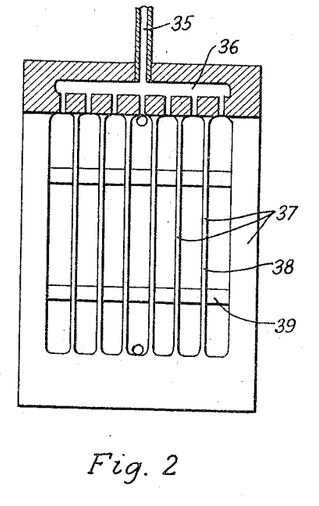
FIG. 2 is a section taken on line 2—2 of FIG. 1.

The apparatus shown in FIG. 1 comprises a housing generally designated as 21 subdivided by membranes 22 and 23 into three chambers 24, 25 and 26. Electrodes 27 and 28 are mounted in the chambers 24 and 26. Inflow and outflow ducts 29, 30 and 31, 32, respectively, lead to and from the electrode chambers. Leads 33 and 34 extend to a suitable source of electric direct current (not shown). The intermediate or product chamber 25 has an outflow duct 35 manifolded by means of a manifold 36 so as to withdraw product liquid evenly from the top of the product chamber.

A membrane spacer or support 37 in the chamber 24 comprises vertical ribs 38 and transverse ribs 39. The spacer supports the membrane 22, if a force is exerted on the membrane 22 from the right which exceeds the force exerted on it from the left, the latter being a function of the liquid pressure in chamber 24. A similar spacer or support 40 is shown in the third chamber 26.

The membrane 22 is shown as being substantially flat, the membrane 23 is shown as having projecting portions 41 and recessed portions 42 at least on the side facing the membrane 22. If the membranes move into a postion of contact, the recessed portions 42 form channels through which product liquid may escape from between the membranes to the outflow duct 35.

The membrane 23 is an ion selective membrane composed of ion exchange material. In the illustrated example the electrode 27 is connected to the positive pole of the source of electric power, hence is the anode. Electrode 28 is connected to the negative pole of the source of electric power and forms the cathode. The membrane polarity is such that cations pass from electrode to electrode, whereas entrance of anions into the product chamber 25 is restricted. Under such circumstances the membrane 23 must be a cation membrane, in other words a membrane which is selectively permeable to cations and passage resistant to anions.

Good selectivity implies that the membrane pores are relatively small in order that the fixed electric charges in the membrane matrix may exert the proper control over ions in the pore liquid which under the bias of the electrodes seek to pass through the pore passages.

Good selectivity further implies a relatively high ionic concentration of the pore liquid. In other words, the number of cations per volumetric unit of liquid in the pores is relatively high. This may also be expressed in terms of ions-to-solvent-content ratio of the pore liquid, which is high.

By way of contrast, the membrane 22 is of a material having larger pores. It may be called a filter membrane and its pore size is principally determined by the desired filtering function. If, for example, it is the object to produce highly purified water, the pore size of the membrane 22 is selected to prevent mechanical impurities and bacteria from passing therethrough.

Cations pass through the pores of the membrane 22 with a considerably larger solvent shell than when passing through the selective membrane 23. Thus, in effect, the cations passing into the central chamber import a larger volume of solvent than they export therefrom when passing through the ion selective membrane 23. The difference between the imported and exported solvent volume is product.

The membrane 22 may be treated to impart ion exchange properties to it, as will later be pointed out.

Figure 3:
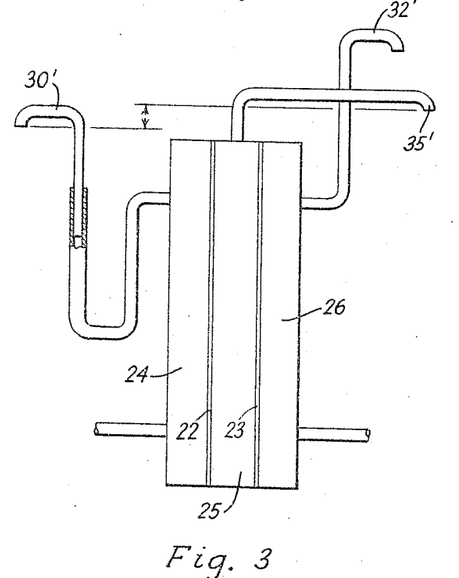
FIG. 3 is a simplified diagrammatic illustration of the cell of FIG. 1 and certain pressure conditions prevailing therein.
Figure 4:
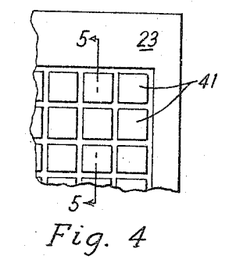
FIG. 4 is an elevational view of a portion of a contoured membrane used in the cell of FIG. 1.
Figure 5:
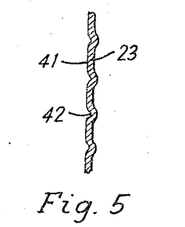
FIG. 5 is a sectional view, the section being taken on line 5—5 of FIG. 4.

FIG. 3 illustrates details of operation of the cell. The outflow 32' from chamber 26 is at all times at a higher level than the outflow 35' from chamber 25 and the outflow 30' from chamber 24. Under these circumstances a higher hydrostatic pressure prevails in chamber 26 than in chamber 25. As a result, the membrane 23 is flexed to the left into proximity of, or contact with, the membrane 22. The membrane 22 is mechanically supported on its left side, hence cannot move out of the way.

The outflow 30' from chamber 24 is indicated to be telescopically adjustable. If level with outflow 35', the hydrostatic pressure on either side of the membrane 22 is the same and any liquid transported through the membrane is liquid transported by moving cations.

The outflow 30' may be set lower than 35', in which event any danger of hydraulic leakage through the membrane is obviated by the tendency of product liquid to leak back into chamber 24 by reason of hydrostatic pressure.

In operation, source liquid to be treated is passed through chamber 24 from which cations and accompanying solvent pass through the membrane 22 into the product chamber 25. The cations continue to move towards the cathode through the ion selective membrane 23, but when passing therethrough are accompanied by a smaller volume of solvent.

Solvent accumulates in the chamber 25, even builds up a hydrostatic pressure therein which tends to separate the contacting membranes 22, 23.

Chamber 26 contains a suitable electrolyte. Passage of anions in the opposite direction through the membrane 23 and into the product chamber is prevented by the ion passage resistance of the membrane 23.

Figure 6:
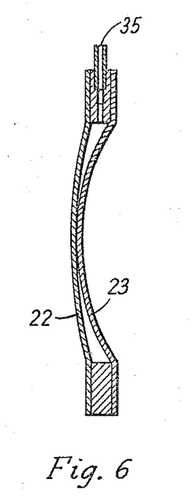
FIG. 6 illustrates an optional membrane arrangement of the cell of FIG. 1.

The membrane support 37, 38 may be dispensed with and the membranes be installed in drum-tight condition stretched within, or over, a frame. Polyethylene membranes lend themselves well to such tightening. Under the hydrostatic pressure acting on membrane 23 the membranes then assume the position shown in FIG. 6.

Figure 7:
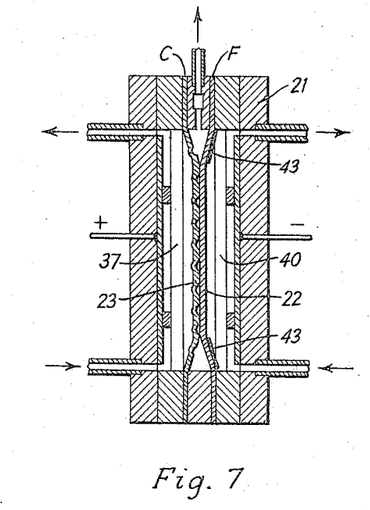
FIG. 7 is a plan view illustrating an optional application of insulation to certain portions of a membrane.

As shown in FIG. 7, the filter membrane 22 may be provided with a solution impermeable border zone 43 preferably wide enough to seal that border portion of the membrane which physically cannot flex into contact with the ion selective membrane. This is conveniently accomplished by applying a coat of lacquer to such area to seal the membrane pores.

Figure 8:
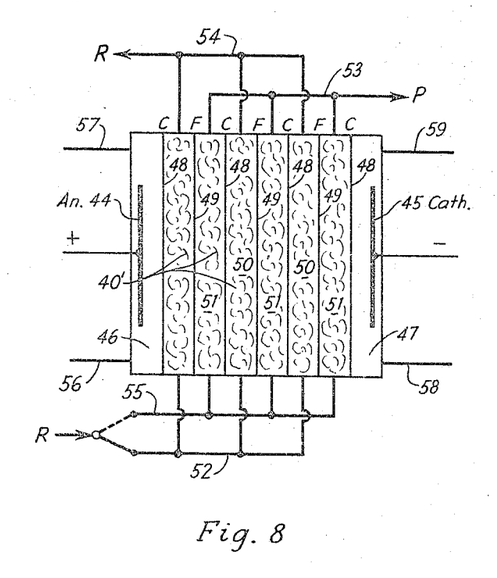
FIG. 8 is a diagrammatic representation of a multi-compartment cell for practicing the present invention.

The apparatus diagrammatically shown in FIG. 8 is a multicell apparatus comprising electrodes 44, 45 in electrode chambers 46 and 47. The space between the electrodes is subdivided into individual raw liquid and product chambers by ion selective membranes 48 and filter membranes 49. Assuming that the electrode 45 is the cathode and electrode 44 is the anode, and assuming that the membranes 48 are cation membranes, then chambers 51 become product chambers and chambers 50 are raw liquid chambers into which liquid to be purified, or concentrated, is introduced through an inflow duct system 52. Product liquid is withdrawn from the chambers 51 through an outflow duct system 53. After extraction of solvent raw liquid leaves the chamber 50 through an outflow duct system 54.

In the event the apparatus of FIG. 8 is to be reversible, a further duct system 55 is provided for the chambers 51.

The chambers are preferably provided with a suitable spacer or filler 40' similar to spacer elements 40 in FIG. 1 or composed of an open mesh material such as Saran, Nylon, etc. to prevent the membranes from flexing or changing the membrane-to-membrane spacing.

The operation of the apparatus of FIG. 8 is as follows:

Assuming that electrode 44 is the anode and electrode 45 is the cathode, assuming that the membranes 48 are cation membranes, and assuming further that the liquid to be treated is water, raw water is introduced through duct system 52 into the chambers 50. The raw water leaves the chambers 50 at a somewhat higher ionic concentration through the duct system 54. Product liquid is withdrawn through the duct system 53. Electrolyte of a suitable composition, which may also be raw water, is passed through the electrode chambers by means of ducts, 56, 57; 58, 59, respectively.

The flow of liquid through the membranes may be reversed, for example, for the purpose of freeing the membrane pores from pore fouling matter by reversing the polarity of the electrodes. In that case chambers 50 become product chambers from which product is withdrawn through duct system 54. The inflow duct system 52 for chambers 50 remains unused. Raw liquid passes through duct system 55 into chambers 51 and leaves chambers 51 through duct system 53.

Anion membranes may be substituted for the cation membranes 48. In that case anions move the solvent, and each chamber having an anion membrane on the anode side becomes a product chamber.

The membranes used in practicing the invention are ion selective membranes and filter membranes. Experience with commercially available ion selective membranes indicates that cation membranes possess greater chemical stability than anion membranes. They are preferred for this reason. The ion selective membranes which are commercially available or which may be made by known procedures may be divided into those which are essentially rigid and others which possess a considerable degree of flexibility and resiliency.

The filter membranes may be essentially ionically nonselective, or they may possess certain ion exchange characteristics.

The filter membranes differ from the ion selective membranes previously referred to in that the filter membranes are of considerably larger pore size, a property on which the practice of this invention depends.

MEMBRANES

Tests were conducted with commercially available filter membranes and commercially available ion selective membranes.

*Filter membranes.*—The filter membranes may be divided into two groups, inherently hydrophilic filter membranes and inherently hydrophobic filter membranes. As will be shown, filter membranes may be treated to impart to them certain desirable characteristics, for example in order to make a hydrophobic membrane hydrophilic.

Many hydrophilic filter membrane materials are cellulose and cellulose derivatives. They are available in a wide range of pore sizes. Some membranes are reinforced by filaments, e.g., nylon for greater physical strength.

"Ultraflex" filter membranes were tested in pore sizes ranging from less than 5 m$\mu$ (UA superdense) to 400 m$\mu$ (coarse). The best results were obtained with membranes of the range between 100 m$\mu$ (UA coarse) and 250 m$\mu$ (A medium).

"Millipore" filter membranes were tested in pore sizes ranging from 10 m$\mu$ (VF) to 5$\mu$ (SM), specific sizes being as follows: VF 10 m$\mu$; VM 50 m$\mu$; VC 100 m$\mu$; GS 220 m$\mu$; PH 300 m$\mu$; HA450 m$\mu$; WH 450 m$\mu$ (nylon reinforced); WS (3$\mu$ (nylon reinforced); SM 5$\mu$. The best results were obtained in the range of pore sizes from 100 m$\mu$ and 450 m$\mu$.

For the treatment of solvents containing organic solvents filter membranes are available made of materials which resist such solvents.

"Ultraflex" membranes were tested in a range of pore sizes from less than 5 m$\mu$ (UO superdense) to 400 m$\mu$ (O coarse). The best results were obtained with a membrane of 250 m$\mu$ pore size (O medium).

"Millipore" membranes are also available in a composition resisting organic solvents. The following were tested: OH 1.5$\mu$; OS 10$\mu$. These membranes consist of polyethylene. The OH membrane was found most satisfactory.

The membrane was also subjected to a chemical surface treatment to impart certain ion exchange properties to it resulting in a desirable reduction of its original hydrophobic behavior. Particulars of the treatment appear below among the examples.

Other synthetic filter membranes which were tested included a 10 m$\mu$ membrane known in the art as Graver "Hisep" membrane. It proved operative when paired with a selective membrane of less than 7 m$\mu$ pore size.

Methods of making filter membranes and their composition are disclosed in German Patents 805,039 and 913,646.

*Ion selective membranes* are commercially available in many different compositions. Their manufacture has been disclosed in the patent literature. Practically all of the present commercially available ion selective membranes are of a pore size between 2 and 10 m$\mu$, the most commonly occurring pore size being between 6 and 7 m$\mu$.

Among the membranes tested were "Amfion" membranes C–60, C–103 (cationic) and A–60 (anionic). These membranes are basically polyethylene/styrene copolymers sulfonated or quaternized as the case may be.

"Nepton" membranes CR–61 and AR 111–A. The CR–61 membrane material is a styrene divinyl benzene copolymer with sulfonic ion exchange groups thereon and is a cation exchange membrane (U.S. Patent 2,731,411). The AR 111–A membrane is a styrene divinyl benzene, vinyl pyridine anion exchange membrane (U.S. Patent 2,860,097).

Further membranes which were tested were composed of phenolsulfonic acid formaldehyde resin (U.S. Patent 2,636,851). These membranes were relatively rigid and somewhat brittle. They do not lend themselves to flexing.

Other ion selective membranes suited for practicing the invention are described in the 1957 issue of Symposium of Saline Water Conversion, U.S. Department of the Interior, pp. 284 to 289.

*Membrane pairing.*—In order to practice the present invention successfully an ion selective membrane is chosen having a selectivity greater than that of the filter membrane. The ion selectivity of the latter may be zero.

When immersed in distilled water the ion selective membrane, depending on its composition, exhibits an ion-to-solvent-content ratio of the pore liquid between 1 N. and 7 N. The normality of the pore liquid of the filter membrane should therefore be less.

As the ion conductive membranes generally have a pore size of the order of 7 m$\mu$, a filter membrane is chosen which possesses larger pores, the range between 100 and 450 m$\mu$ being preferred. However, a filter membrane of 10 m$\mu$ has proved operative.

EXAMPLES

*Example 1.*—A three compartment cell was constructed comprising platinum electrodes in the electrode chambers and a central compartment formed by two membranes, each membrane having an active exposed surface of 50 mm. in width and 60 mm. in height. Spacing of the membranes from each other and from the electrodes 3 mm. The electrode chambers were provided with inflow and outflow ducts at the bottom and top, respectively, and the central product chamber had an outflow duct at the top. The ion selective membrane was an "Amfion" cation membrane C–103 and the filter membrane was an S & S "Ultraflex" A medium membrane. A grid spacer was placed between the membranes and the electrodes made from a sheet of polyethylene plastic having 13 vertical slots milled into it, each slot being 3 mm. wide, leaving 12 ribs of slightly less than 2 mm. in width.

A liquid mixture was prepared consisting of water to which equal parts of NaCl, KCl and Na$_2$SO$_4$ were added to produce an electrical resistivity of the aqueous solution of 125 ohms. The solution was circulated through the electrode chambers at the rate of 100 cc. per minute. The pressure in the three chambers was adjusted by connecting flexible tubing thereto and raising the outflow ends of the tubing to different levels.

The pressure in the anode chamber, facing the filter membrane, was maintained 15 cm. water column lower than that of the cathode chamber. The pressure in the product chamber was maintained lower than that of the catholyte pressure and equal to or slightly higher than the anolyte pressure. The pressure in the product chamber was adjusted by raising or lowering its outflow duct in such a way as to produce the two test conditions described below.

(a) Electrolyte was circulated through the electrode chambers and the outflow duct from the central compartment was so adjusted as to produce no flow into or from the central compartment at a time no electrical potential was applied to the electrodes. This condition was readily observable by watching the meniscus at the end of the duct.

A direct potential was then applied to produce a current of 100, 200 and 400 ma., respectively.

Results:

| Ma. | Volts | Product flow rate, cc./min. | Resistivity, ohms cm. |
|---|---|---|---|
| 100 | 4 | 0.33 | 360 |
| 200 | 6.6 | 0.68 | 3,500 |
| 400 | 13 | 1.5 | 42,000 |

(b) The height of the outflow duct from the central compartment was so adjusted as to cause a flow of 0.1 cc./min. from the central compartment through the filter membrane into the anode compartment at a time no electrical potential was applied to the electrodes.

A direct potential was then applied to produce a current of 100, 200 and 400 ma., respectively.

Results:

| Ma. | Volts | Product flow rate, cc./min. | Resistivity, ohms cm. |
|---|---|---|---|
| 100 | 4.2 | 0.27 | 750 |
| 200 | 7.3 | 0.61 | 6,800 |
| 400 | 15.5 | 1.4 | 69,000 |

*Example 2.*—Apparatus and operating conditions a and b as in Example 1. Liquid treated: an aqueous solution containing equal parts of $Na_2SO_4$ and $MgCl_2$ adjusted to a resistivity of 240 ohms cm.

Results:

*Condition a*

| Ma. | Volts | Product flow rate, cc./min. | Resistivity, ohms cm. |
|---|---|---|---|
| 100 | 6.8 | 0.45 | 40,000 |
| 400 | 21 | 3.0 | 180,000 |

*Condition b*

| Ma. | Volts | Product flow rate, cc./min. | Resistivity, ohms cm. |
|---|---|---|---|
| 100 | 7.3 | 0.4 | 92,000 |
| 200 | 12.5 | 1.33 | 106,000 |

*Example 3.*—Apparatus of Example 1. Liquid treated: aqueous solution of equal parts of $Na_2SO_4$ and $Na_2CO_3$ adjusted to a resistivity of 2,600 ohms. cm.

Results:

*Condition a*

| Ma. | Volts | Product flow rate, cc./min. | Resistivity, ohms cm. |
|---|---|---|---|
| 20 | 8.6 | 1.2 | 350,000 |
| 50 | 21.2 | 4.1 | over 600,000 |
| 70 | 50 | 5.2 | 1,200,000 |

*Example 4.*—In the apparatus of Example 1 an "Amfion" anion membrane A–60 was substituted for the cation membrane C–103 and an S & S "Ultraflex" dense membrane was used as filter membrane. The pressure in the anode chamber was adjusted to exceed the pressure in the cathode chamber by 12 cm. water column. Liquid treated: New York City tap water having a resistivity of 13,000 ohms cm.

Results:

| Ma. | Volts | Product flow rate, cc./min. | Resistivity, ohms cm. |
|---|---|---|---|
| 16 | 25 | 2.5 | 450,000 |
| 30 | 50 | 5.0 | 800,000 |
| 40 | 75 | 6.8 | 1,100,000 |
| 50 | 100 | 7.5 | over 1,200,000 |

The product of 450,000 ohm cm. resistivity was evaporated and showed a smaller relatively insoluble siliceous residue than water of equal resistivity treated with a cation membrane. The process appears to be particularly useful for the preparation of nonscaling boiler feed water.

*Example 5.*—A three compartment cell was constructed comprising platinum electrodes in the electrode chambers and a central compartment formed by two membranes, each membrane having an active exposed surface of 50 mm. in width and 60 mm. in height spaced 3 mm. from one another and from the electrodes, respectively. The electrode chambers were provided with inflow and outflow ducts at the bottom and top, respectively, and the central product chamber had an outflow duct at the top.

The ion selective membrane was an "Amfion" C–60 cation membrane and the filter membrane was a "Millipore" type OH membrane, which is a polyethylene membrane filter of 1.5μ pore size.

*Result.*—19 ma.; 100 volts; 4.0 cc./min.; 1,800,000 ohms cm.

In this assembly the filter membrane has a relatively large pore size and is composed of a hydrophobic material possessing great chemical stability.

*Example 6.*—In the apparatus of Example 5 the filter membrane was replaced by a membrane of identical original composition and characteristics, but first subjected to a sulfonation treatment as follows:

The "Millipore" OH membrane of an original pore size of 1.5μ and consisting of polyethylene sheet material was irradiated by bactericidal ultraviolet radiation emitted by a 100 watt quartz lamp for one hour at a distance of 30 cm. The irradiated sheet was then soaked in styrene for five minutes at 30° C., then air dried, and then immersed in chlorosulfonic acid for ten minutes, subsequently washed in aqueous 1 N NaCl solution.

After this treatment the sheet was found to possess cation exchanging as well as hydrophilic properties. The membrane filter thus produced was light brown in appearance as a result of a thin surface layer of styrene sulfonate grafted to the polyethylene matrix. The thin layer could be removed by scraping with a knife blade exposing the white interior of the matrix of the filter membrane. The membrane was weakly conductive which is consistent with the observation that the membrane matrix appears to remain nonconductive polyethylene.

*Result.*—70 ma.; 100 volts; 9.5 cc./min.; 850,000 ohms cm.

The filter membrane used in Example 5, as the treated filter membrane used in Example 6, was chemically highly stable, mechanically very strong and extremely flexible.

Other filter membranes were prepared by quaternizing the polyethylene "Millipore" OH filter membranes and gave similar results. In the latter tests the treated anionic filter membrane was used in combination with a "Nepton" anion membrane AR 111–A.

*Example 7.*—In an apparatus constructed according to the specifications of the apparatus of Example 1, but fitted with a cation membrane "Nepton" CR–61 and an "Ultraflex" O medium filter membrane. Liquid treated: a solution of sodium chloride in methyl alcohol having a resistivity of 2,400 ohms cm.

*Result.*—40 ma.; 27.5 volts; 5.3 cc./min.; 480,000 ohms cm.

The product was demineralized methyl alcohol.

*Example 8.*—In the apparatus of Example 7 a mixture of equal parts of ethyl alcohol and benzene was treated to which enough potassium sulfate was added to produce a resistivity of the mixture of 2,600 ohms cm.

*Result.*—28 ma.; 42 volts; 4.4 cc./min.; 270,000 ohms cm.

The product liquid was demineralized and consisted predominantly of ethyl alcohol with a relatively small admixture of benzene. This example indicates the usefulness of the process in extracting a nonaqueous component from a conductive solution.

*Example 9.*—A three compartment cell was constructed comprising platinum electrodes in the electrode chambers and a central compartment formed by two membranes, each membrane having an exposed surface 50 mm. wide and 60 mm. high.

An "Amfion" cation membrane C–103 was stretched drum tight over a frame of 3 mm. thickness and clamped in place between the frame and the end portion of the cell comprising the electrode. The membrane had a contoured surface facing the filter membrane, the contour being formed of a crisscross grid of channels 0.2 mm. deep, 0.3 mm. wide, the channels being spaced 6 mm.

The filter membrane was a "Millipore" microweb WH membrane stretched tight in a frame of 3 mm. thickness. The corners of the filter membrane were passed through slots in the frame and wedged in the slots by substantially cylindrical pieces of soft rubber. The central product chamber had a product outlet at the top.

Liquid treated: New York City tap water having a resistivity of 13,000 ohms cm.

Results:

| Ma. | Volts | Product flow rate, cc./min. | Resistivity, ohms cm. |
|---|---|---|---|
| 13 | 25 | 2.5 | 1,400,000 |
| 21 | 50 | 4 | 1,800,000 |
| 28 | 75 | 6 | 2,000,000 |
| 31 | 100 | 7 | 2,000,000 |
| 38 | 125 | 8 | 2,000,000 |

The product had extremely high purity and is suited for all purposes for which presently doubly and trebly distilled water is used, for example boiler feed water.

The water was poured into a clean glass vessel, covered with a clean glass cover and left standing for 48 hours. The resistivity of the water was then again measured and found to be 680,000 ohms cm. It appears that the highly deionized water is capable of dissolving glass to form a weakly mineralized solution.

Figure 9:
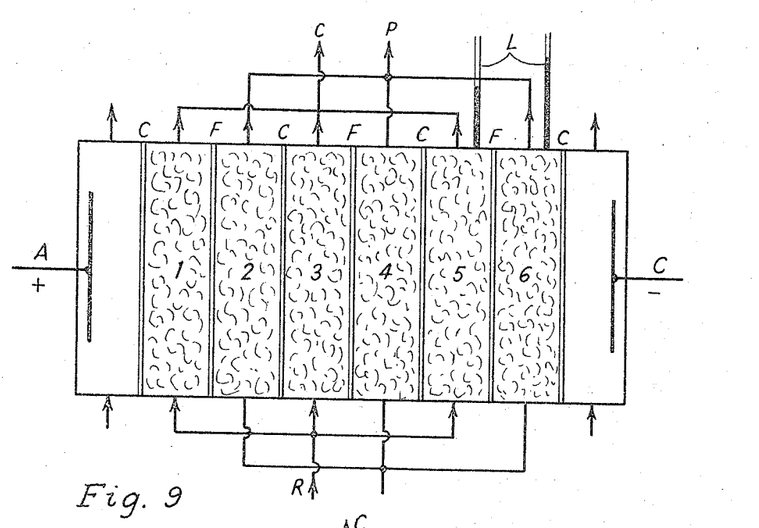
FIGS. 9 and 10 are diagrammatic representations of tests cells illustrating the operating conditions.

*Example 10.*—A multicompartment cell was constructed, as shown diagrammatically in FIG. 9, comprising four cation membranes C and three filter membranes F arranged in alternating sequence to form six treatment chambers and two electrode compartments containing platinum electrodes. Chamber dimensions 50x60x1.5 mm. Liquid permeable nonconductive Saran screen spacers of ¼-inch mesh in all chambers for supporting and spacing the membranes.

All chambers had top and bottom ducts manifolded as shown.

The membranes were: four "Nepton" cation CR–61 membranes and three S & S "Ultraflex" A medium membranes.

In operation raw liquid was passed through one set of treatment chambers in an upward direction at a total flow rate of 60 cc./min. through the chambers. The bottom manifold of the product chambers was shut off. The electrode in the chamber immediately adjacent a product chamber was made the cathode.

Flexible ducts extending from the liquid outflows were adjusted to produce a hydrostatic pressure in the product chambers equal to, or slightly higher than, in the raw liquid chambers as indicated by liquid columns L in FIG. 9.

Liquid treated: a muddy natural brackish water of a resistivity of 265 ohms cm.

The direct potential was adjusted to produce a current of 300 ma. through the cell.

*Results.*—After 45 minutes of operation the liquid product outflow was 5.8 cc./min., was clear and had a resistivity of 28,800 ohms cm. After 24 hours of operation the flow rate had decreased to 5.25 cc./min. The current was then reversed, the potential adjusted to produce a current of 500 ma. and maintained for six minutes. This caused a small quantity of product liquid to be sucked back into the product chambers from the outflow duct. The current was then again reversed to resume the original operating condition with the potential adjusted to produce a current of 300 ma. After 30 minutes of operation the outflow rate was 5.9 cc./min. and the resistivity of the product was 28,100 ohms cm. After 24 hours of operation the outflow rate dropped again to 5.3 cc./min.

The cell was then operated with alternating cycles of product of six hours and reversed current operation of six minutes. Thirty minutes after reversal the production rate was between 5.8 and 6.0 cc./min. and declined to between 5.3 and 5.5 cc./min. at the end of the six hour period.

The reduction in the production rate may be due to gradual clogging of the membrane pores, but the original production rate was restored by the brief periodic current reversal.

*Example 11.*—A test was conducted to determine the possibility of restoring the original porduction rate without current reversal by hydraulically induced reversal of the direction of liquid flow through the membranes. A hydrostatic pressure was applied to the product chambers equal to 40 cm. of water column over the pressure prevailing in the raw liquid chamhbers. The normal operating current was not interrupted during this period. Application of the aforementioned pressure for 30 seconds was sufficient to clear the membranes, but a greater amount of electrode scaling was observed than under conditions of current reversal.

Figure 10:
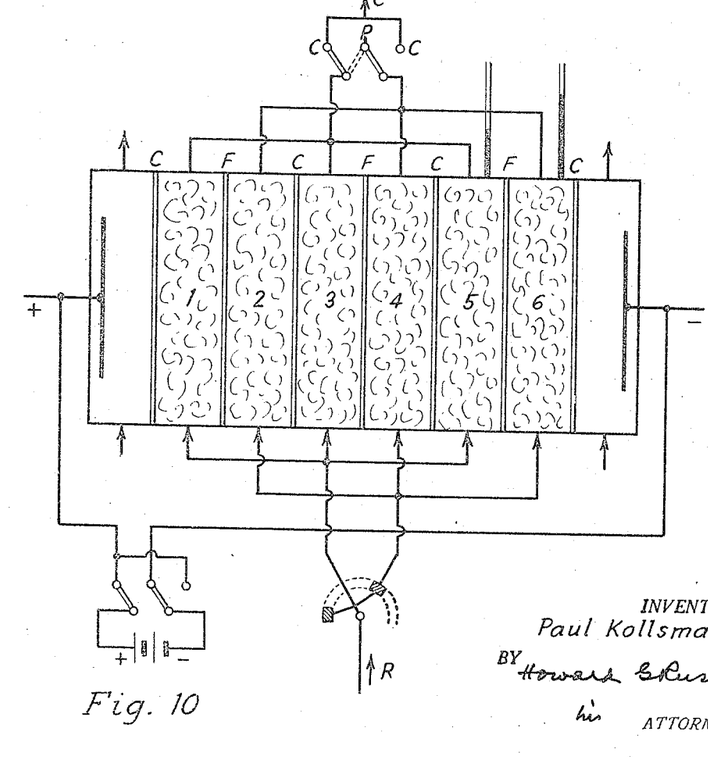

*Example 12.*—The cell of Example 10 was operated by periodically reversing the current and interchanging the liquid flows as diagrammatically shown in FIG. 10.

The diagrammatic figure indicates that when raw liquid passes into chambers 1, 3 and 5 the bottom ducts of chambers 2, 4 and 6 are closed and vice versa. Product liquid is withdrawn from the tops of chambers 2, 4, 6 and 1, 3, 5, respectively. Liquid treated: natural muddy brackish water of a resistivity of 265 ohms cm.

*Results.*—First cycle: Current 340 ma., product flow rate initially 6.3 cc./min. After six hours 5.4 cc./min. Product resistivity 32,400 ohms cm.

Second cycle: Current 340 ma., product flow rate after 30 minutes 6.4 cc./min. After six hours 5.5 cc./min.. product resistivity 32,000 ohms cm.

Third cycle: Current 340 ma., product flow rate after 30 minutes 6.3 cc./min. After six hours 5.3 cc./min.. product resistivity 32,200 ohms cm.

The fourth and subsequent cycles gave results consistent with cycles 2 and 3.

*Example 13.*—Example 3 was repeated except that a small quantity of bentonite was added to the raw solution to form a muddy suspension.

*Result.*—65 ma.; 50 volts; 4.9 cc./min.; 1,300,000 ohms cm.

*Example 14.*—Example 6 was repeated except that a small quantity of bentonite was added to the raw solution to form a muddy suspension.

*Result.*—70 ma.; 100 volts; 9.5 cc./min.; 860,000 ohms, cm.

Tests 13 and 14 indicate that the addition of the anionic bentonite particles caused a slight reduction of product flow rate through a neutral filter membrane. This is believed to be due to a slight degree of clogging. No such reduction occurs in the product flow rate through the cation exchange membrane filter.

It appears that the electrical charge of the cation exchange membrane filter is capable of repelling anionic particles. The use of charged membrane filters appears to be indicated in the treatment of solutions containing suspended particles of the same charge polarity. Thus cation exchange filters are suited where anionic particles such as clay are present and anion exchange filters where cationic particles such as protein particles (gelatine) are present.

*Example 15.*—The apparatus of Example 1, but fitted with a "Nepton" CR-61 cation membrane and an "Ultraflex" A medium membrane. The liquid treated was city tap water of 8,000 ohms cm. resistivity containing some heavy metal ions and flowing through the cell in a single pass.

*Results.*—After 30 minutes of operation: 40 ma.; 50 volts; 5.2 cc./min.; 400,000 ohms cm. After three days of operation: 26 ma.; 50 volts; 3.9 cc./min.; 480,000 ohms cm.

The cell was then inspected and it was found that the filter membrane was coated with thin green scale. Aqueous 0.1 N HCl solution was then passed through the cell for five minutes and normal operation was resumed.

*Results.*—After 30 minutes of operation: 40 ma.; 50 volts; 5.3 cc./min.; 390,000 ohms cm. After three days of operation: 29 ma.; 50 volts; 4.3 cc./min.; 430,000 ohms cm.

The cell was then again rinsed with aqueous 0.1 N HCl solution and operation resumed.

*Result.*—After 30 minutes of operation: 40 ma.; 50 volts; 5.2 cc./min.; 410,000 ohms cm.

*Example 16.*—The apparatus of Example 15 was supplied with city tap water of 8,000 ohms cm. resistivity and a sufficient amount of HCl was added to adjust the pH of the water to 5.0.

*Results.*—After 30 minutes of operation: 57 ma.; 50 volts; 4.9 cc./min.; 370,000 ohms cm. After three days of operation: 58 ma.; 50 volts; 5.0 cc./min.; 360,000 ohms cm.

*Example 17.*—Example 15 was repeated but at a lower current density.

*Results.*—After 30 minutes of operation: 19 ma.; 25 volts; 3.4 cc./min.; 240,000 ohms cm. After three days of operation: 19 ma.; 25 volts; 3.5 cc./min.; 220,000 ohms cm.

Substitution of sulphuric acid for the hydrochloric acid produced comparable results.

Comparing the results of Examples 15, 16 and 17, it is evident that treatment of water containing scale forming constituents presents no problem as long as the current density is maintained low.

At higher current densities at which scale tends to form, scale formation was prevented by the addition of a small amount of acid to the feed stream.

Alternatively, formation of scale may be removed by periodic brief acid rinses.

In all instances where the product liquid passed through membranes of a pore size smaller than 0.3 micron the product was bacteria free. It is a fact well known in the art that bacteria can be removed from liquids, particularly water, by filtration through filters of appropriate pore size.

The advantage of bacteria removal is inherent in the present method which employs ions to move liquid through membranes and filters of a pore size small enough to remove bacteria.

What is claimed is:

1. The process of extracting solvent from an ionic solution of a certain ionic concentration by the action of an electric current passing through the solution in a membrane cell, the process comprising the steps of driving ions of one polarity of the solution by the electric current through a first membrane contacted on one side by the solution; driving said ions by the said electric current through a second membrane into an electrolyte liquid on the far side of the second membrane, in which a hydraulic pressure relationship is maintained on opposite sides of the first membrane such that, in the absence of an electric current, there is substantially no hydraulic flow from said one side through the first membrane to its other side, and in which the first membrane is of larger effective pore size than the second membrane, and in which the second membrane has a pore liquid of a higher ionic concentration than the said ionic solution, whereby ions of said one polarity pass through the first membrane in more highly solvated condition than through the second membrane; restricting the flow of ions of the opposite polarity through at least the membrane of smaller pore size; and removing solvent product accumulating between the two membranes as a result of the difference in the ionic solvent transport through the two membranes.

2. The process of extracting solvent from an ionic solution of a certain ionic concentration by the action of an electric current passing through the solution in a membrane cell, the process comprising the steps of driving ions of one polarity of the solution by the electric current through a first membrane contacted on one side by the solution; driving said ions by the said electric current through a second membrane into an electrolyte liquid on the far side of the second membrane, in which a hydraulic pressure relationship is maintained on opposite sides of the first membrane such that, in the absence of an electric current, there is substantially no hydraulic flow from said one side through the first membrane to its other side, and in which the first membrane is of larger effective pore size than the second membrane, and in which the second membrane has a pore liquid of a higher ionic concentration than the said ionic solution, whereby ions of said one polarity pass through the first membrane in more highly solvated condition than through the second membrane, the second membrane being selectively permeable to ions of said one polarity and passage resistant to ions of the opposite polarity; and removing the solvent product accumulating between the two membranes as a result of the difference in the ionic solvent transport through the two membranes.

3. The process of extracting solvent from an ionic solution of a certain ionic concentration by the action of an electric current passing through the solution in a membrane cell, the process comprising the steps of driving solution ions of a certain polarity by the electric current through a first membrane permeable to ions of both polarities, said first membrane being contacted on one side by the solution and a hydrostatic pressure relationship being maintained on opposite sides of said first membrane such that, in the absence of an electric current through the membrane, there is substantially no hydraulic flow from said one side through the first membrane to its other side; and thereafter moving the same ions of said certain polarity by the said electric current through a second membrane selectively permeable to ions of said certain polarity and passage resistant to ions of the opposite polarity into an electrolyte liquid on the far side of said second membrane, the second membrane having in its pores a pore liquid of higher ionic concentration than the said ionic solution causing solvated ions of said certain polarity to pass in more highly solvated condition through the first membrane into the space between the membranes than the said last named ions pass out of said space through the second membrane; and removing solvent product accumulating between the two membranes as a result of the different in the ionic solvent transport through the two membranes.

4. The process of extracting solvent from an ionic solution of a certain ionic concentration by the action of an electric current passing through the solution in a membrane cell, the process comprising the steps of driving solution ions of a certain polarity by the electric current through a first membrane selectively permeable to ions of said certain polarity and passage resistant to ions of the opposite polarity and then moving the same certain ions through a second membrane selectively permeable to ions of said certain polarity and passage resistant to ions of the opposite polarity and having a higher ions-of-said-certain-polarity-to-solvent ratio than said first membrane and higher than said ionic solution; and removing solvent product accumulating in the space between the two membranes as a result of the difference in the solvent volume transported in relation to the number of ions through the two membranes by the ions of said certain polarity.

5. The process of extracting solvent from an ionic solution of a certain ionic concentration by the action of an electric current passing through the solution in a membrane cell, the process comprising the steps of driving ions of one polarity of the solution by the electric current through a first membrane contacted on one side by the solution; driving said ions by the said electric current through a second membrane into an electrolyte liquid on the far side of the second membrane, in which the first membrane is of larger effective pore size than the second to pass more highly solvated ions of said one polarity through the first membrane than through the second membrane, the pore liquid of the second membrane being of a higher ionic concentration than said ionic solution; restricting the flow of ions of the opposite polarity through at least the said second membrane; maintaining a lower hydraulic pressure between the first and the second membrane than on at least one of the far sides of the said second membrane, as viewed from the space between the membranes, and maintaining a hydraulic pressure relationship on opposite sides of said first membrane such that, in the absence of an electric current, there is substantially no hydraulic flow from said one side through said first membrane to its other side; and removing from said space solvent product accumulating in said space as a result of the difference in the ionic solvent transport through the said two membranes.

6. The process of extracting solvent from an ionic solution of a certain ionic concentration by the action of an electric current passing through the solution in a membrane cell, the process comprising the steps of driving ions of one polarity of the solution by the electric current through a first membrane contacted on one side by the solution; driving said ions by the said electric current through a second membrane into an electrolyte liquid on the far side of the second membrane, in which the first membrane is of larger effective pore size than the second to pass more highly solvated ions of said one polarity through the first membrane than through the second membrane, and in which the pore liquid of the second membrane has a higher ionic concentration than said ionic solution; restricting the flow of ions of the opposite polarity through at least the said second membrane; maintaining an unbalance in hydrostatic pressure on the membranes such as to urge the membranes towards a position of minimum spacing while maintaining a hydraulic pressure relationship on opposite sides of said first membrane such that, in the absence of an electric current, there is substantially no hydraulic flow from said one side through said first membrane to its other side; and removing solvent product accumulating between the two membranes as a result of the difference in the ionic solvent transport through the two membranes.

7. The process of extracting solvent from an ionic solution of a certain ionic concentration by the action of an electric current passing through the solution in a membrane cell, the process comprising the steps of driving ions of one polarity of the solution by the electric current through a first membrane contacted on one side by the solution; driving said ions by the said electric current through a second membrane into an electrolyte liquid on the far side of the second membrane, in which the first membrane is of larger effective pore size than the second to pass more highly solvated ions of said one polarity through the first membrane than through the second membrane, and in which the pore liquid of the second membrane has a higher ionic concentration than said ionic solution; restricting the flow of ions of the opposite polarity through at least the said second membrane; maintaining a lower hydrostatic pressure on the near side of the first membrane than the hydrostatic pressure between the two membranes, and maintaining a higher hydrostatic pressure on the far side of said second membrane than between the two membranes; and removing solvent product accumulating between the two membranes as a result of the difference in the ionic solvent transport through the two membranes.

8. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being also permeable to ions of said certain polarity but having a higher ions-of-said-certain-polarity-to-solvent content than the membranes of said first type, the membranes of the second type further comprising a pore liquid of an ionic concentration exceeding the ionic concentration of said solution; passing an electric current in series through said membranes and the liquid hereinafter recited; selectively restricting passage of ions of the opposite polarity tending to pass through the cell in the opposite direction to ions of said certain polarity; maintaining ionic liquid to be desolvated in cell spaces on the near side of said membranes of the first type, considering the direction of travel of the said certain ions through the cell; and removing solvent product from spaces on the far side of the membranes of said first type, said last named spaces being bounded on the far side by a membrane of said second type.

9. The process of extracting solvent from an ionic solution of a certain ionic concentration by the action of an electric current in a multichamber cell in which two types of membranes are arranged in alternating sequence, the membranes of the first type being permeable to ions of a certain polarity, the membranes of the second type being selectively permeable to ions of the first polarity and passage resistant to ions of the opposite polarity, the membranes of the first type having a larger effective pore size to pass more highly solvated ions of said certain polarity therethrough than through said membranes of the second type, the membranes of the second type further comprising a pore liquid whose ionic concentration exceeds the ionic concentration of said solution; passing an electric current in series through said membranes and the liquid hereinafter recited; maintaining ionic liquid to be desolvated in cell spaces on the near side of said membranes of the first type, considering the direction of travel of the said certain ions through the cell; and removing solvent product from spaces on the far side of the membranes of said first type, said last named spaces being bounded on the far side by a membrane of said second type.

10. The process of extracting solvent from an ionic solution of a certain ionic concentration by the action of an electric current in a multimembrane cell in which two types of membrances of iron exchange material are arranged in alternating sequence, the membranes of the first type being selectively permeable to ions of a certain polarity and passage resistant to ions of the opposite polarity, the membranes of the second type being also selectively permeable to ions of said certain polarity and passage resistant to ions of the opposite polarity but having a higher ions-of-said-certain-polarity-to-solvent content than said first type of membranes, the pore liquid of the membranes of the second type having an ionic concentration in excess of the ionic concentration of said solution; passing an electric current in series through said membranes and the liquid hereinafter recited; maintaining ionic liquid to be desolvated in cell spaces on the near side of said membranes of the first type, considering the direction of travel of the said certain ions through the cell; and removing solvent product from spaces on the far side of the membranes of said first type, said last named spaces being bounded on the far side by a membrane of said second type.

11. The process of extracting solvent from an ionic solution of a certain ionic concentration by the action of an electric current in a multichamber cell in which two types of membranes are arranged in alternating sequence, the membranes of the first type having a lower ions-of-a-certain-polarity-to-solvent content than the membranes of the second type, the membranes of the second type comprising a pore liquid of a higher ionic concentration than the ionic concentration of said solution; passing an electric current in series through said membranes; restricting the passage of ions of the opposite polarity through said cell in relation to ions of said certain polarity; maintaining ionic liquid to be desolvated in cell spaces on the near side of said membranes of the first type, considering the direction of travel of the said certain ions through the cell; and removing solvent product from spaces on the far side of the membranes of said first type, said last named spaces being bounded on the far side by a membrane of said second type.

12. The process of extracting solvent from an ionic solution of a certain ionic concentration by the action of an electric current passing through the solution in a membrance cell, the process comprising the steps of driving ions of one polarity of the solution by the electric current in sequence through the first membrane contacted on one side by the solution and then through a second membrance in contact with an electrolyte liquid on the far side of the second membrane, at least one of the membranes having a contoured surface facing the other membrane, the contoured surface comprising protruding portions along which the membranes may contact, and recessed portions, the first membrane being of larger effective pore size than the second membrane to pass more highly solvated ions of said one polarity through the first membrane than through the second membrane, the second membrane comprising a pore liquid of an ionic concentration higher than the ionic concentration of said solution; restricting the flow of ions of the opposite polarity through at least the membrane of smaller pore size; maintaining a lower hydraulic pressure between the said membranes than on at least one of the far sides of the said membranes as viewed from the space between the membranes to urge the membranes into contact along said protruding portions; and removing from said space solvent product accumulating in said space as a result of the difference in the ionic solvent transport through the said two membranes.

13. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being permeable to ions of said certain polarity but having a higher ions-of-said-certain-polarity-to-solvent content than the membranes of said first type, the membranes of the second type comprising a pore liquid whose ionic concentration exceeds the ionic concentration of said solution; passing an electric current in series through said membranes and the liquid hereinafter recited; selectively restricting passage of ions of the opposite polarity tending to pass through the cell in a direction opposite to the ions of said certain polarity; maintaining ionic liquid to be desolvated in first cell spaces on the near side of said membranes of the first type, considering the direction of travel of the said certain ions through the cell; removing solvent product from second cell spaces on the far side of the membranes of said first type, said last named second cell spaces being bounded on the far side by a membrane of the second type; and maintaining a lower hydrostatic pressure inside said second spaces than said first spaces, the pressure difference being sufficient to urge the membranes bounding said second spaces into contact at least during the condition of non-current flow.

14. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being permeable to ions of said certain polarity but having a higher ions-of-said-certain-polarity-to-solvent content than the membranes of said first type, the membranes of the second type comprising a pore liquid whose ionic concentration exceeds the ionic concentration of said solution; passing an electric current in series through said membranes and the liquid hereinafter recited; selectively restricting passage of ions of the opposite polarity tending to pass through the cell in a direction opposite to the ions of said certain polarity; feeding ionic liquid to be desolvated into alternate first cell spaces on the near side of said membranes of the first type, considering the direction of travel of said certain ions through the cell; removing solvent product from second cell spaces which alternate with said first cell spaces, said second spaces being bounded on the far side by membranes of the second type; maintaining a lower hydostatic pressure in said second cell spaces than in said first cell spaces to reduce the membrane spacing in said second spaces and enlarge the membrane spacing in said first cell spaces; and periodically reversing the direction of the electric current through the cell and simultaneously (a) interchanging the liquids by feeding liquid to be desolvated into the second spaces and removing solvent product from the said first spaces and (b) changing the hydrostatic pressure relationship to maintain a lower hydrostatic pressure in said first spaces during withdrawal of solvent product therefrom than in said second spaces to reduce the membrane spacing in said first spaces during solvent product withdrawal therefrom.

15. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being permeable to ions of said certain polarity but having a higher ions-of-said-certain-polarity-to-solvent content than the membranes of the first type, the membranes of the second type comprising a pore liquid whose ionic concentration exceeds the ionic concentration of said solution, at least the membranes of one of the two types have a contoured surface, the contoured surface comprising protruding portions along which a contoured membrane may contact the adjacent membrane, and recessed portions; passing an electric current through said membranes and the liquid in inter-membrane spaces hereinafter recited; selectively restricting passage of ions of the opposite polarity tending to pass through the cell in a direction opposite to the ions of said certain polarity; feeding ionic liquid to be desolvated in first cell spaces on the near side of said membranes of the first type, considering the direction of travel of said certain ions through the cell; removing solvent product from second cell spaces bounded by a membrane of the first type on the near side and bounded by a membrane of the second type on the far side; and maintaining a lower hydrostatic pressure in said second spaces than in said first spaces to reduce the membrane spacing in said second spaces and enlarge, correspondingly, the membrane spacing in said first spaces.

16. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being permeable to ions of said certain polarity but having a higher ions-of-said-certain-polarity-to-solvent content than the membranes of the first type, the membranes of the second type comprising a pore liquid whose ionic concentration exceeds the ionic concentration of said solution, at least the membranes of one of two types having opposite contoured surfaces comprising protruding membrane portions and recessed membrane portions along which protruding portions the contoured membrane may contact the adjacent membrane; passing an electric current through said membranes and the liquid in intermembrane space hereinafter recited; selectively restricting passage of ions of the opposite polarity tending to pass through the cell in a direction opposite to the ions of said certain polarity; feeding ionic liquid to be desolvated in first cell spaces on the near side of said membranes of the first type, considering the direction of travel of the said certain ions through the cell; removing solvent product from second cell spaces bounded by a membrane of the first type on the near side and bounded by a membrane of the second type on the far side; maintaining a lower hydrostatic pressure in said second spaces than in said first spaces to reduce the membrane spacing in said second spaces and enlarge, correspondingly, the membrane spacing in said first spaces; and periodically reversing the direction of the electric current through the cell and simultaneously (a) interchanging the liquids by feeding liquid to be desolvated into the second spaces and removing solvent product from said first spaces and (b) reversing the hydrostatic pressure relationship to maintain a lower hydrostatic pressure in said first spaces during withdrawal of solvent product therefrom than in said second spaces, to reduce the membrane spacing in said first spaces during solvent production therein, and enlarge correspondingly, the membrane spacing in said second spaces.

17. The process of extracting solvent from an ionic solution of a certain ionic concentration by the action of an electric current in a multimembrane cell in which two types of membranes are arranged in alternating sequence, the membranes of the first type being permeable to ions of a certain polarity, the membranes of the second type being also permeable to ions of said certain polarity but having a higher ions-of-said-certain-polarity-to-solvent content than the membranes of said first type, the membranes of the second type comprising a pore liquid whose ionic concentration exceeds the ionic concentration of said solution; passing an electric current in series through said membranes and the liquid hereinafter recited; selectively restricting passage of ions of the opposite polarity tending to pass through the cell in the opposite direction to ions of said certain polarity; feeding ionic liquid to be desolvated in first cell spaces on the near side of said membranes of the first type, considering the direction of travel of said certain ions through said cell, the current path through said first cell spaces being of a certain mean length; and removing solvent product from second cell spaces on the far side of the membranes of said first type, said last named second cell spaces being bounded by a membrane of the second type on the far side while maintaining the mean length of the current path through said second cell spaces shorter than the mean length of the current path through said first cell spaces.

18. The method of separating a portion of the solvent component of an ionic solution from the balance of the solution which comprises, moving by an electric current a certain number of ions of one polarity and a certain amount of solvent of the solution in one direction from a first chamber through a permeable membrane into a second chamber; moving substantially the same number of ions of the same polarity but a lesser amount of solvent by the same current in the same direction from the said second chamber through a further permeable membrane into a third chamber; maintaining a hydrostatic pressure relationship on opposite sides of said first membrane such that, in the absence of an electric current, there is substantially no hydraulic flow from said first chamber through said first membrane into said second chamber; and withdrawing solvent accumulating in said second chamber.

19. The method of separating a portion of the solvent component of an ionic solution from the balance of the solution which comprises, moving by an electric current a certain number of ions of one polarity and a certain amount of solvent in one direction from a first volume through a first permeable membrane into a second volume; moving substantially the same number of ions of the same polarity but a lesser amount of solvent by the same current in the same direction from the said second volume through a further permeable membrane into a third volume; simultaneously restricting movement of ions of the opposite polarity in the opposite direction from said third volume into said first volume; maintaining a hydrostatic pressure relationship on opposite sides of said first membrane such that, in the absence of an electric current, there is substantially no hydraulic flow from said first volume through said first membrane into said second volume; and withdrawing solvent accumulating in said second volume.

20. The method of separating a portion of the solvent component of an ionic solution from the balance of the solution which comprises, moving by an electric current a certain number of ions of one polarity and a certain amount of solvent in one direction from a first volume through a first permeable membrane into a second volume; moving substantially the same number of ions of the same polarity but a lesser amount of solvent by the same current in the same direction from the said second volume through a further permeable membrane into a third volume; simultaneously restricting movement of ions of the opposite polarity in the opposite direction from said third volume into said first volume; withdrawing solvent accumulating in said second volume; maintaining a hydrostatic pressure relationship on opposite sides of said first membrane such that, in the absence of an electric current, there is substantially no hydraulic flow from said first volume through said first membrane into said second volume; and maintaining an unbalance in the hydrostatic pressures acting on said volumes such as to urge the membranes towards contact within the second volume.

21. The method of desalting an aqueous saline solution in which the water is present in excess of the water of hydration in an electrodialysis cell comprising, between two spaced electrodes a pair of membranes of which one membrane is a filter membrane of a certain pore size and of which the other membrane has a smaller pore size than said one membrane, said membranes subdividing the space between said electrodes into at least three liquid spaces, the method comprising, supplying said solution to be desalted into the first space; maintaining a hydraulic pressure relationship between said first and said second space such that, in the absence of an electric current, there is substantially no hydraulic flow from the first space through the first membrane into the second space; applying a direct electrical potential to the electrodes to drive by the resulting electric current ions and water from the first space through the first membrane into the second space and to drive the ions from the second space through the second membrane into the third space; and withdrawing from the second space deionized water accumulating therein as a result of the difference in water transfer by the driven ions through the two membranes.

22. The method of desalting an aqueous saline solution in which the water is present in excess of the water of hydration in an electrodialysis cell comprising, between two spaced electrodes a pair of membranes of which one membrane is a filter membrane of a certain pore size and of which the other membrane is a permselective membrane having a smaller effective pore size for passage of ions of a certain polarity to which said other membrane is preferentially permeable than the pore size of said one membrane, said membranes subdividing the space between said electrodes into at least three liquid spaces, the method comprising, supplying said solution to be desalted into the first space; maintaining a hydraulic pressure relationship between said first and said second space such that, in the absence of an electric current, there is substantially no hydraulic flow from the first space through the first membrane into the second space; applying a direct electrical potential to the electrodes to drive by the resulting electric current ions of said certain polarity and water from the first space through the first membrane into the second space and to drive the ions from the second space through the second membrane into the third space; and withdrawing from the second space deionized water accumulating therein as a result of the difference in water transfer by the driven ions through the two membranes.

23. The method of desalting an aqueous saline solution in which the water is present in excess of the water of hydration in an electrodialysis cell comprising, between two spaced electrodes a pair of membranes of which one membrane is a filter membrane of a certain pore size and of which the other membrane has a smaller pore size than said one membrane, said membranes subdividing the space between said electrodes into at least three liquid spaces, the method comprising, supplying said solution to be desalted into the first space; maintaining a hydraulic pressure relationship between said first and said second space such that, in the absence of an electric current, there is substantially no hydraulic flow from the first space through the first membrane into the second space; applying a direct electrical potential to the electrodes to drive by the resulting electric current ions and water from the first space through the first membrane into the second space and to drive the ions from the second space through the second membrane into the third space; urging said membranes towards a position of physical contact with each other; and withdrawing from second space deionized water accumulating therein as a result of the difference in water transfer by the driven ions through said two membranes, said accumulating water tending to separate said membranes.

24. The method of desalting an aqueous saline solution in which the water is present in excess of the water of hydration in an electrodialysis cell comprising, between two spaced electrodes a pair of membranes of which one membrane is a filter membrane of a certain pore size and of which the other membrane is a permselective membrane having a smaller effective pore size for passage of ions of a certain polarity to which said other membrane is preferentially permeable than the pore size of said one membrane, said membranes subdividing the space between said electrodes into at least three liquid spaces, the method comprising, supplying said solution to be desalted into the first space; maintaining a hydraulic pressure relationship between said first and said second space such that, in the absence of an electric current, there is substantially no hydraulic flow from the first space through the first membrane into the second space; applying a direct electrical potential to the electrodes to drive by the resulting electric current ions of said certain polarity and water from the first space through the first membrane into the second space and to drive the ions from the second space through the second membrane into the third space; maintaining a higher hydrostatic pressure in said third space to urge said membranes towards a position of physical contact with each other; and withdrawing from said second space deionized in water accumulating therein as a result of the difference in water transfer by the driven ions through said two membranes, said accumulating water tending to separate said membranes.

25. The method of desalting an aqueous saline solution in which water is present in excess of the water of hydration which comprises moving under the influence of a direct electrical potential ions of said solution from a first space into which said solution is fed through a first filter membrane of a certain pore size into a second space between said first membrane and a second membrane having a pore size smaller than said first membrane; moving by the same potential ions from said second space through said second membrane into a further space under a condition of hydrostatic pressures in the first and second spaces such that there is substantially no hydraulic flow through said first membrane into the second space in the absence of an electric current resulting from said application of electrical potential; and withdrawing from said second space water accumulating therein by reason of the greater transfer of water by the ions through said first membrane than through said second membrane.

References Cited by the Examiner

UNITED STATES PATENTS

| | | | |
|---|---|---|---|
| 2,815,320 | 12/1957 | Kollsman | 204—180 |
| 2,897,130 | 7/1959 | Van Dorsser | 204—301 |
| 2,923,674 | 2/1960 | Kressman | 204—180 |
| 2,970,098 | 1/1961 | Ellis | 204—301 |
| 3,017,338 | 1/1962 | Butler et al. | 204—180 |
| 3,063,924 | 11/1962 | Gomella | 204—180 |

OTHER REFERENCES

Abstracts of papers presented as Symposium of Saline Water Conversion, National Academy of Sciences—National Research Council, 1957 (pages 21–26).

HOWARD S. WILLIAMS, *Primary Examiner.*

JOHN R. SPECK, JOHN H. MACK, *Examiners.*

G. E. BATTIST, E. ZAGARELLA, *Assistant Examiners.*